United States Patent Office
3,479,404
Patented Nov. 18, 1969

3,479,404
FLUORIMINO-CYCLO-ALKANES AND ALKENES
Harry F. Smith, Wayne, and Joseph A. Castellano, North Brunswick, N.J., assignors to Thiokol Chemical Corporation, Bristol, Pa., a corporation of Delaware
No Drawing. Filed Oct. 14, 1966, Ser. No. 588,242
Int. Cl. C09b 57/00; C07c 119/06; A01n 9/20
U.S. Cl. 260—566          5 Claims

ABSTRACT OF THE DISCLOSURE

The compounds of this invention are 1,4-difluoriminocyclohexene-2, 1,2-difluoriminocyclohexane, cyclohexylidenefluorimine, and 1,2-difluoriminocyclohexene-3. The compounds are useful as dyes, photochromic agents and biocides.

---

This invention relates to novel fluorimino compounds and a method of preparing the same. More particularly, this invention relates to compounds wherein at least one fluorimino group is part of a hydrocarbon molecule which contains a double bond or conjugated double bonds between carbon atoms, the molecule being either cyclic or straight-chained and in some cases having an element other than carbon as part of the chain. These compounds are useful as dyes, photochromic agents and biocides.

Heretofore strong bases have been used to dehydrofluorinate alkyldifluoramines to form fluorimines. This practice results in the formation of undesirable by-products. Furthermore, separation of the fluorimine from the by-products and from the strong base is difficult. In accordance with the present invention, novel fluorimines have been prepared by reacting secondary alkyl- and cycloalkyldifluoramines with an ion-exchange resin. As the ion-exchange resin is a solid, it is readily removed from the product. The invention has also been found to minimize degradation of the compound being processed, thereby providing more economical production of the desired fluorimine.

It is accordingly an object of this invention to provide novel fluorimines.

Another object of the invention is to provide a more efficient method of preparing fluorimines.

A further object of this invention is to provide a novel process for removing hydrogen fluoride from organic difluoramines without producing substantial quantities of degradative contaminants. Additional objects will become apparent to those skilled in the art upon further examination of this application.

In accordance with this invention, a difluoramino starting material is brought into contact with a basic ion-exchange resin until dehydrofluorination takes place. Where the nature of the starting material requires, its viscosity is first reduced with an inert solvent. The fluid starting material is then intimately contacted with the ion-exchange resin, either by mixing it with a finely divided form of the ion-exchange resin or by allowing it to percolate through a column or bed of the ion-exchange resin. A hydrogen fluoride molecule is lost to the ion-exchange resin from each difluoramino group and the secondary carbon atom to which it is attached, after which the fluorimine product is isolated by separting it from the ion-exchange resin and any inert solvent. Because the ion-exchange resin is a solid, separation is easily accomplished, as by filtration or decantation. Any inert solvent is removed by evaporation. Depending upon the physical state of the product, purification can be effected by solvent extraction, recrystallization, chromatography and the like.

The inventive process is advantageous in several respects, including flexibility of reaction conditions, efficiency of the reaction, and availability of various suitable ion-exchange resins. For instance, the reaction proceeds efficiently between about −10 to 80° C., but the reaction is preferably carried out between 20 to 40° C. The reaction time varies with temperature, the ion-exchange resin used, and with the difluoramino starting material. However, in most instances the reaction is complete within 16 to 24 hours, with from 4 to 8 hours being the typical length of time required.

The ratio of ion-exchange resin to difluoramino starting material can vary considerably. Less than stoichiometric quantities of ion-exchange resin are to be avoided because under such condition the dehydrofluorinated product would have to be separated from unreatced difluoramino starting material. On the other hand, a large excess of ion-exchange resin over difluoramine starting material does not adversely affect the reaction, although such excess is wasteful. For these reasons it is preferred that the quantity of resin used be in the range of one to two equivalents of base per equivalent of difluoramine. Pressure has no effect upon the reaction, and consequently the process is ordinarily performed at atmospheric pressure.

The following compounds illustrate difluoramino starting materials that can be used in carrying out the invention:

1,4-bis(difluoramino)cyclohexene-2
1,2-bis(difluoramino)cyclohexene-3
bis(1-difluoroaminoheptyl) ether
bis(1-difluoramino-2-phenylethyl) ether
2,3-bis(difluoramino)pentane
1,2-bis(difluoramino)cyclohexane
2,5-bis(difluoramino)-2,5-dihydrofuran
cyclohexyldifluoramine
cis-1,2-bis(difluoramino)cyclododecane
trans-1,2-bis(difluoramino)cyclododecane
2,3-bis(difluoramino)butane
1,4-bis(difluoramino)cyclooctene-2

Ion-exchange resins which can be employed are weakly basic ion-exchange resins. These are cross-linked polystyrene resins containing secondary or tertiary amine groups and are illustrated by the materials sold under the following trademarks:

"Amberlite IR–45,"
"Duolite A–4,"
"Dowex –3,"
"Ionac A–330,"
"Rexyn 208."

The invention is further illustrated by the following examples:

EXAMPLE I

The product obtained from the reaction of 6.40 g. (80 mmoles) of 1,3-cyclohexadiene with 12.48 g. (120 mmoles) of tetrafluorohydrazine was dissolved in 60 ml. of ethyl ether and then stirred with 65 g. of a weakly basic ion-exchange resin, Amberlite IR–45, in 150 ml.

of ethyl ether at 10–15° C. for 20 hours. The resin was then removed by filtration and washed with ethyl ether. Ether was evaporated from the combined filtrate and washes, and the residue was then extracted with hot pentane. Pentane was evaporated from the extract, and the residue was recrystallized from pentane to yield 130 g. of colorless crystals (11.3% overall yield), M.P. 52–52.5° C., which were found to be 1,4-difluoriminocyclohexene 2 having the structural formula

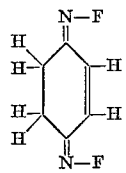

*Analysis.*—Calculated for $C_6H_6N_2F_2$: C, 50.00; H, 4.20; N, 19.44. Found: C, 49.89; H, 4.31; N, 19.45.

EXAMPLE II

A solution of 4.02 (22 mmoles) of a cis-trans mixture of 1,2-bis(difluoramino)cyclohexane in 20 ml. ethyl ether was stirred with 16.0 g. (80 mmoles) of Amberlite IR–45 ion-exchange resin for 72 hours at room temperature. The mixture was filtered and the resin was washed with ether. The combined filtrate and washes were evaporated to dryness, yielding 2.00 g. (64%) of yellow liquid. The product was distilled to yield 1.60 g. (51.5%) of yellow liquid, B.P. 64–66° C. at 0.05 mm. Hg, M.P. 5–6° C., $n_D^{20}=1.4661$, which was found to be 1,2-difluorimino-cyclohexane having the structural formula

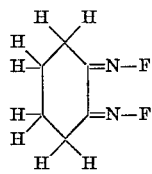

*Analysis.*—Calculated for $C_6H_8N_2F_2$: C, 49.31; H, 5.52; N, 19.17. Found: C, 49.53; H, 5.51; N, 18.97.

EXAMPLE III

To a solution of 1.4 g. (10 mmoles) of cyclohexyldifluoramine (B.P. 38° C. at 24 mm. Hg) in 50 ml. of ethyl ether were added 3.0 g. (15 milliequivalents) of Amberlite IR–45 ion-exchange resin. The mixture was heated at reflux (approximately 35° C.) for 20 hours and the resin then removed by filtration. Evaporation of solvent from the filtrate left 1.0 g. of yellow liquid residue, which after distillation (B.P. 75–78° C. at 30 mm. Hg) gave 0.4 g. of colorless solid cyclohexylidenefluorimine having the structural formula

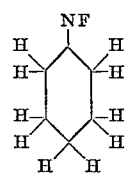

Its infrared spectrum showed the C=NF linkage at 1670 cm.$^{-1}$ and changes in the N—F region, 800–1040 cm.$^{-1}$. The $F^{19}$ N.M.R. spectrum had peaks at 16.56 and 18.76 $\phi$, indicative of C=NF.

It will be understood that mixtures of various starting materials may be processed. For instance, the starting material of Example I was a mixture of 1,4-bis(difluoramino)cyclohexene-2 and 1,2-bis(difluoramino)cyclohexene-3, and, of course, 1,2-difluoroiminocyclohexene-3, having the structural formula

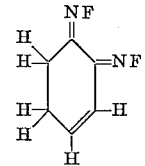

although not quantitatively determined, was also formed in the reaction with the ion-exchange resin. Cis and trans isomers can be processed together, as in Example II, to give the same product.

Although ethyl ether was employed as the solvent in the examples it will be understood that other solvents can be used. Examples are:

Ethers—
   Tetrahydrofuran
   Dioxane
   Diisopropyl ether

Halocarbons—
   Methylene chloride
   Chloroform
   Trichlorotrifluoroethane
   Methyl chloroform
   Trichloroethylene
   Tetrachloroethane Ketones—
   Acetone
   Methyl ethyl ketone Because a small amount of the product is retained in the ion-exchange resin after filtration, yields may be improved by washing the filter cake with solvent. Those skilled in the art will recognize that various modifications may be made without departing from the scope of the invention.

What is claimed is:
1. A compound selected from the class consisting of fluorimino compounds represented by the structural formulas:

(a) 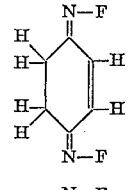  (b) 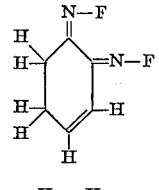

(c) 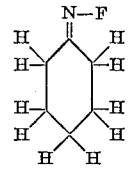  (d) 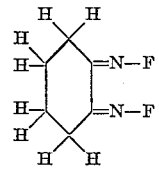

2. 1,4-Difluoroiminocyclohexene-2.
3. 1,2-Difluoriminocyclohexane.
4. Cyclohexylidenefluorimine.
5. 1,2-Difluoriminocyclohexene-3.

References Cited

UNITED STATES PATENTS 3,200,152   8/1965   Ruppert et al. _____ 260—570
3,215,709   11/1965   Logothetis _____ 260—349
3,228,936   11/1966   Davis et al. _____ 260—564 X ROBERT V. HINES, Primary Examiner U.S. Cl. X.R.

23—190; 260—347.7, 563, 570.5, 583, 584, 666, 999